United States Patent
Hardy et al.

(10) Patent No.: US 11,288,785 B2
(45) Date of Patent: Mar. 29, 2022

(54) VIRTUAL OVERLAY SYSTEM AND METHOD FOR OCCLUDED OBJECTS

(71) Applicant: JAGUAR LAND ROVER LIMITED, Coventry (GB)

(72) Inventors: Robert Hardy, Coventry (GB); Sebastian Paszkowicz, Coventry (GB); George Alexander, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 270 days.

(21) Appl. No.: 16/087,959

(22) PCT Filed: Mar. 23, 2017

(86) PCT No.: PCT/EP2017/057008
§ 371 (c)(1),
(2) Date: Sep. 24, 2018

(87) PCT Pub. No.: WO2017/162832
PCT Pub. Date: Sep. 28, 2017

(65) Prior Publication Data
US 2020/0320676 A1    Oct. 8, 2020

(30) Foreign Application Priority Data
Mar. 25, 2016 (GB) ...................... 1605137

(51) Int. Cl.
*G06T 7/00* (2017.01)
*B60R 1/00* (2006.01)
(Continued)

(52) U.S. Cl.
CPC .............. *G06T 7/0002* (2013.01); *B60R 1/00* (2013.01); *G02B 27/0101* (2013.01);
(Continued)

(58) Field of Classification Search
CPC ......... G06T 7/0002; G06T 11/00; G06T 7/70; G06T 2207/30252; G06K 9/00818;
(Continued)

(56) References Cited

U.S. PATENT DOCUMENTS

2009/0041304 A1    2/2009  Bradai et al.
2010/0023254 A1*   1/2010  Machino ............. G09B 29/007
                                                           701/533
(Continued)

FOREIGN PATENT DOCUMENTS

WO    2014198544 A1    5/2014

OTHER PUBLICATIONS

International Search Report and Written Opinion, PCT/EP2017/057008, dated Jun. 13, 2017, 12 pages.
(Continued)

*Primary Examiner* — Sing-Wai Wu
(74) *Attorney, Agent, or Firm* — McCoy Russell LLP (57) ABSTRACT

The present invention provides a system and method of displaying a representation of a road sign. The method comprises receiving information associated with the road sign, the information associated with the road sign comprising a front face of the road sign and a location of the road sign in a road system; receiving an image from a camera, the road sign being within the field of view of the camera; determining, using the image, an amount of the road sign that is obstructed; generating, in dependence on the amount obstructed, the representation of the road sign using the information associated with the road sign; and outputting the representation of the road sign for display.

18 Claims, 11 Drawing Sheets

(51) Int. Cl.
*G02B 27/01* (2006.01)
*G06K 9/00* (2006.01)
*G06T 7/70* (2017.01)
*G06T 11/00* (2006.01)
*G08G 1/0967* (2006.01)
*G08G 1/0962* (2006.01)
*G06F 17/00* (2019.01)
*G06T 19/00* (2011.01)

(52) U.S. Cl.
CPC ............ *G06K 9/00818* (2013.01); *G06T 7/70* (2017.01); *G06T 11/00* (2013.01); *B60R 2300/10* (2013.01); *B60R 2300/205* (2013.01); *B60R 2300/30* (2013.01); *B60R 2300/70* (2013.01); *G02B 2027/014* (2013.01); *G02B 2027/0138* (2013.01); *G02B 2027/0141* (2013.01); *G06T 2207/30252* (2013.01)

(58) Field of Classification Search
CPC ... B60R 1/00; B60R 2300/10; B60R 2300/30; B60R 2300/205; B60R 2300/70; G02B 27/0101; G02B 2027/0138; G02B 2027/014; G02B 2027/0141
See application file for complete search history.

(56) References Cited

U.S. PATENT DOCUMENTS

| | | |
|---|---|---|
| 2010/0067805 A1 | 3/2010 | Klefenz |
| 2013/0033603 A1 | 2/2013 | Suzuki et al. |
| 2014/0079297 A1* | 3/2014 | Tadayon ............ G06K 9/00288 382/118 |
| 2015/0012200 A1 | 1/2015 | Joshi et al. |
| 2016/0360104 A1* | 12/2016 | Zhang .................. G06T 15/205 |
| 2018/0292229 A1* | 10/2018 | Maruyama ............ B60K 35/00 |

OTHER PUBLICATIONS

Search and Examination Report, GB1605137.7, dated Sep. 6, 2016, 5 pages.
Search and Examination Report, GB1704607.9, dated May 22, 2017, 6 pages.

* cited by examiner

PRIOR ART

VIRTUAL OVERLAY SYSTEM AND METHOD FOR OCCLUDED OBJECTS

CROSS-REFERENCE TO RELATED APPLICATIONS

This application is a 371 of International Application No. PCT/EP2017/057008, filed Mar. 23, 2017, which claims priority to GB Patent Application 1605137.7, filed Mar. 25, 2016, the contents of both of which are incorporated by reference herein in their entirety.

TECHNICAL FIELD

The present disclosure relates to a virtual overlay system and method for occluded objects and particularly, but not exclusively, to a system and method for overlaying a virtual road sign for a vehicle driver. Aspects of the invention relate to a method of displaying a representation of a road sign, to a non-transitory computer-readable storage medium, to a system for displaying a representation of a road sign, to a processor and to a vehicle.

BACKGROUND

Vehicle drivers often rely on road signs that provide information, warning and/or instructions such as speed limits, directions, road layout diagrams, height restrictions etc. However, overgrown trees and bushes can sometimes occlude and/or obscure road signs, impeding or preventing vehicle drivers from reading the road signs.

Figure 1A:
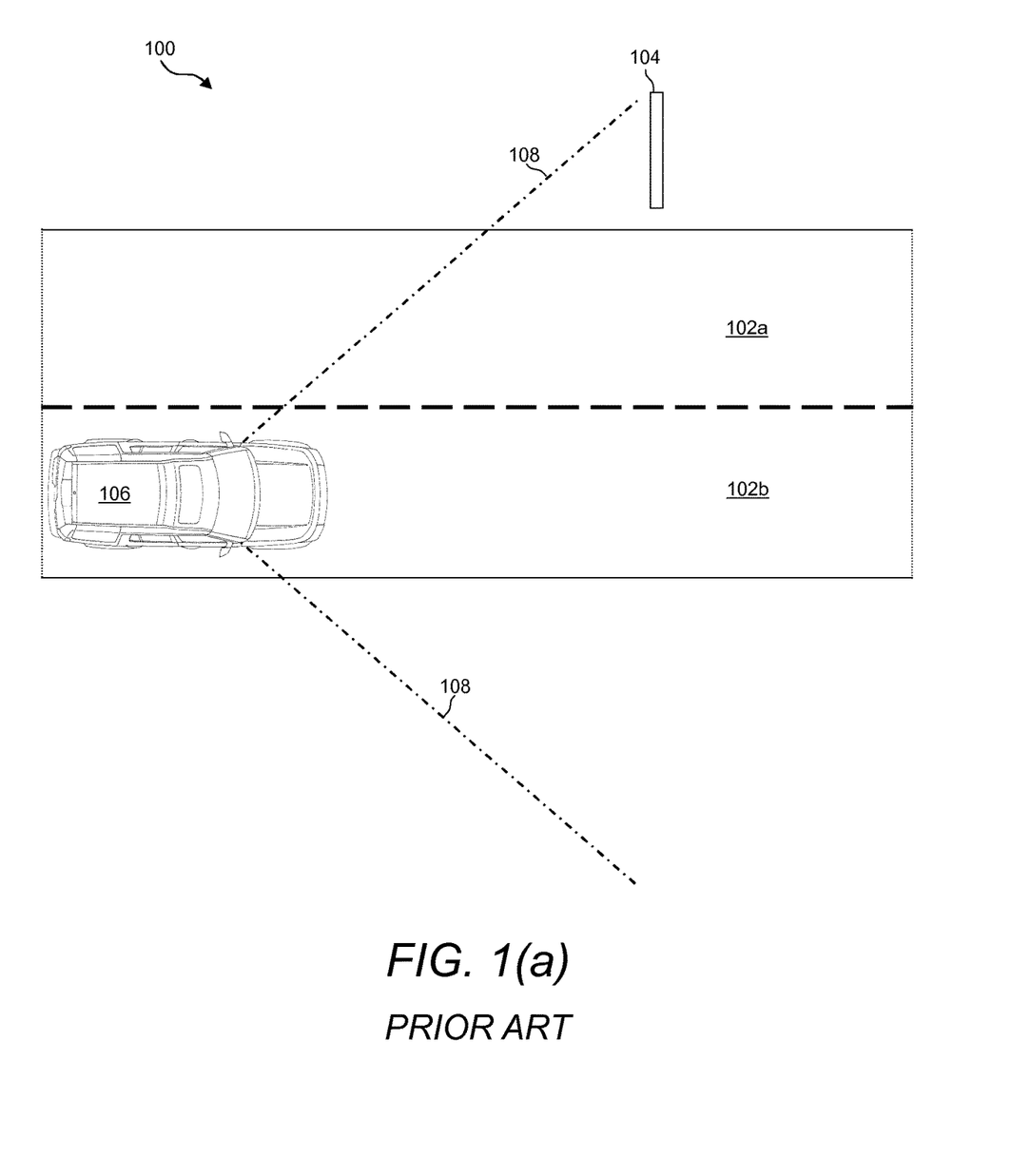
FIG. 1(a) is a schematic top view of a road system with a road sign and a vehicle.
Figure 1B:
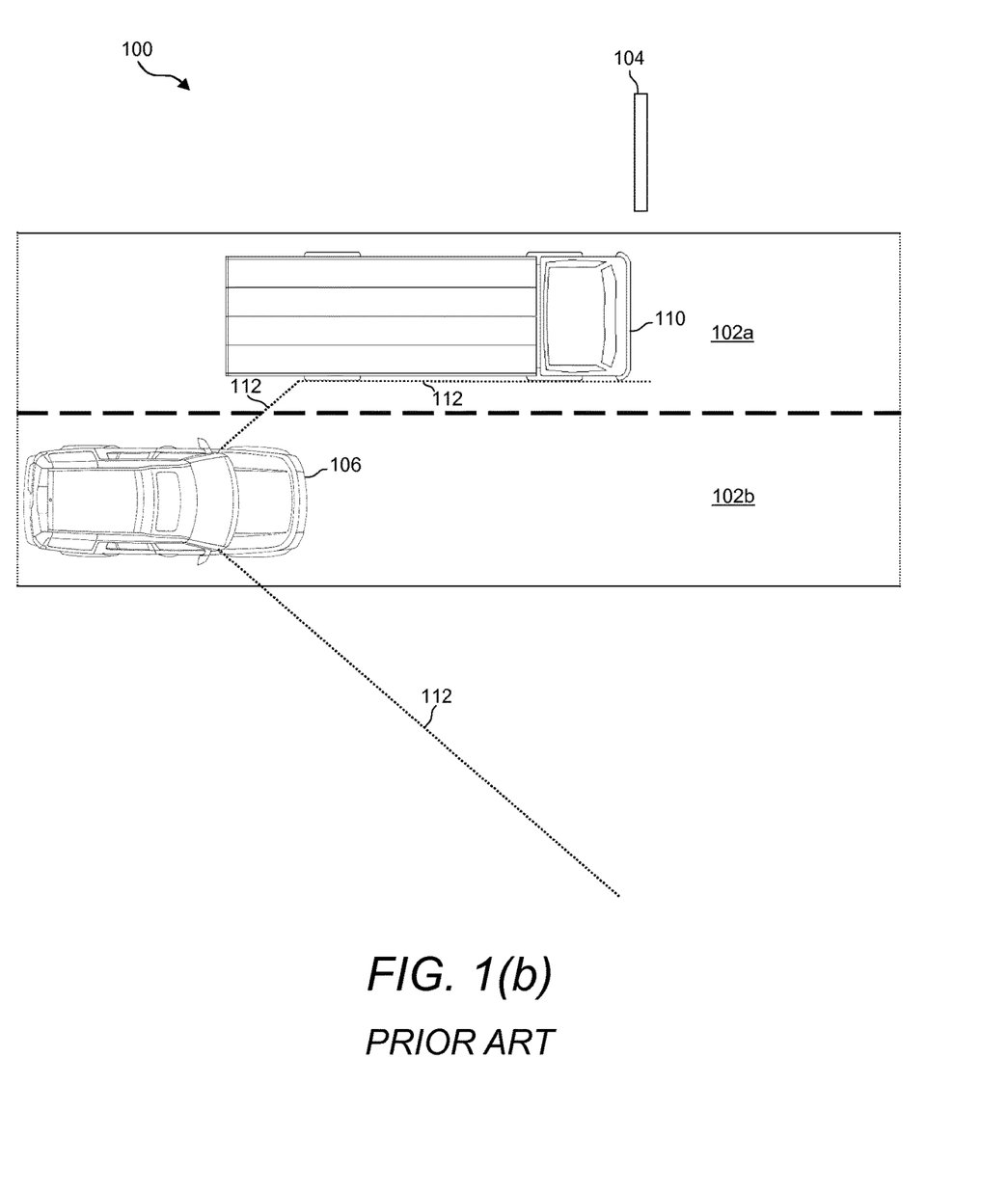
FIG. 1(b) is a schematic top view of the road system of FIG. 1(a) with a goods vehicle travelling parallel to the vehicle.

A further scenario that may prevent road signs from being read is discussed with reference to FIGS. 1(a) and (b). FIG. 1(a) shows a road system 100 comprising two parallel traffic lanes (a first lane 102a and a second lane 102b) and a road sign 104. Vehicles in the two traffic lanes travel in the same direction. A vehicle 106 is shown travelling in the road system 100 in the second lane 102b. A driver of the vehicle 106 has a field of view depicted by the lines 108. The road sign 104 is ahead of the vehicle 106 and is in the field of view 108 of the driver.

FIG. 1(b) shows the road system 100 with the vehicle 106 and a goods vehicle 110. The goods vehicle 110 is shown travelling parallel to the vehicle 106 in the first lane 102a. The presence of the goods vehicle 110 affects the field of view of the vehicle driver, shown as lines 112. In particular, the goods vehicle blocks driver of the vehicle 106 from reading the road sign 104.

In the scenario of FIG. 1(b), the road sign 104 may be visible to the driver of the vehicle 106 prior to the road sign 104 being blocked from view by the goods vehicle 110. However, this may be for an insufficient length of time for the driver to read the road sign 104.

The inability for drivers to read road signs to obtain pertinent information presents a safety hazard, for example, if a driver of a tall vehicle is unaware of a height restriction of a low bridge. Additionally, some drivers may attempt to mitigate the problem of a road sign being blocked by a parallel vehicle by altering their vehicle speed (slowing down or speeding up) in order to maintain a clear view of the road sign. However, this inconsistent driving speed may cause a hazard to other road users.

The present invention has been devised to mitigate or overcome at least some of the above-mentioned problems.

SUMMARY OF THE INVENTION

Aspects and embodiments of the invention provide a method, a non-transitory computer-readable storage medium, a system, a processor and a vehicle as claimed in the appended claims.

According to an aspect of the present invention there is provided a method of displaying a representation of a road sign, the method comprising: receiving information associated with the road sign, the information associated with the road sign comprising a front face of the road sign and a location of the road sign in a road system; receiving an image from a camera, the road sign being within the field of view of the camera; determining, using the image, an amount of the road sign that is obstructed; generating, in dependence on the amount obstructed, the representation of the road sign using the information associated with the road sign; and outputting the representation of the road sign for display.

An advantage of the method is that if a road sign is partly or wholly obstructed from the view of the camera, a representation of the road sign is outputted for display, for example to a user, enabling the user to read the road sign even though it is partly or wholly obstructed to the user.

In the image received by the camera, the road sign may be directly viewable by the camera in the field of view, or the road sign may be within the field of view but be partially or fully obscured in the image received by the camera.

The information associated with the road sign may be received from the camera, and the representation is generated based on the image and the location from the camera. The location of the road sign may conveniently be determined from the images received from the camera.

Optionally, the information associated with the road sign is stored in a memory, and the representation is generated based in dependence on the information in the memory.

Optionally, the information associated with the road sign is received from a remote server and stored in a database, and the representation is generated based in dependence on the information in the database. A benefit of this is if the road sign is never visible to the camera, it can still be displayed. Where the information associated with the road sign is received from a remote server, the location of the vehicle may conveniently be determined from a location determining means (such as a GPS unit) within the vehicle. The location of the vehicle may be determined using the location determining means and, accordingly, the road signs that should be in the field of view of the camera.

Optionally, the method comprises outputting the representation of the road sign to a head-up display.

Optionally, the method comprises outputting the representation of the road sign on the head-up-display to be overlaid over the position of the road sign when viewed by a user.

Optionally, the camera comprises a wide angle lens.

A non-transitory computer-readable storage medium may comprise computer-readable instructions for a computer processor to carry out the method above.

According to another aspect of the present invention there is provided a system for displaying a representation of a road sign, the system comprising: an input arranged to receive: information associated with the road sign, the information associated with the road sign comprising a front face of the road sign and a location of the road sign in a road system; and an image from a camera, the road sign being within the field of view of the camera; a processor arranged to: determine, using the image, an amount of the road sign that is obstructed; generate, in dependence on the amount obstructed, the representation of the road sign using the information associated with the road sign; and an output arranged to output the representation of the road sign for display.

Optionally, the information associated with the road sign is received from the camera, and the representation is generated based on the image and the location from the camera. The location of the road sign may conveniently be determined from the images received from the camera.

Optionally, the information associated with the road sign is received from a remote server and stored in a database, and the representation is arranged to be generated based on the information in the database. Where the information associated with the road sign is received from a remote server, the location of the vehicle may conveniently be determined from a location determining means (such as a GPS unit) within the vehicle. The location of the vehicle may be determined using the location determining means and, accordingly, the road signs that should be in the field of view of the camera.

Optionally, the representation of the road sign is arranged to be output to a head-up-display.

Optionally, the representation of the road sign on the head-up-display is arranged to be output to a head-up-display to be overlaid over the position of the road sign when viewed by a user.

Optionally, the camera comprises a wide angle lens.

According to another aspect of the present invention there is provided a processor configured to: receiving information associated with the road sign, the information associated with the road sign comprising a front face of the road sign and a location of the road sign in a road system; receiving an image from a camera, the road sign being within the field of view of the camera; determining, using the image, an amount of the road sign that is obstructed; generating, in dependence on the amount obstructed, the representation of the road sign using the information associated with the road sign; and outputting the representation of the road sign for display.

A vehicle may comprise the system described above and/or the processor described above.

According to another aspect of the invention there is provided a method of displaying a representation of a road sign, the method comprising: receiving, at an overlay system, information associated with the road sign, the information associated with the road sign comprising a front face of the road sign and a location of the road sign in a road system; receiving, at a camera input module of the overlay system, an image from a camera, the road sign being within the field of view of the camera; determining, in a sign detection module of the overlay system, using the image, an amount of the road sign that is obstructed; generating, in an occlusion detection module of the overlay system, in dependence on the amount obstructed, the representation of the road sign using the information associated with the road sign; and outputting from the overlay system to a display the representation of the road sign for display.

The overlay system may comprise an electronic processor having an electrical input for receiving signals comprising the information associated with the road sign and the image from the camera. The overpay system may further comprise an electronic memory device electrically coupled to the electronic processor and having instructions stored therein. The determining, generating and outputting steps may comprise the processor being configured to access the memory device and execute instructions stored therein such that it is operable to carry out the steps of the method of displaying a representation of a road sign.

The sign detection module, occlusion detection module and camera input module may comprise a plurality of processing arrangements within the processor. Alternatively the sign detection module, occlusion detection module and camera input module may each be located in their own processor such that the overlay system comprises a plurality of processors each of which is coupled to the electronic memory device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

FIGS. 1(a) and (b) have already been described above by way of background, in which:

One or more embodiments of the invention will now be described, by way of example only, with reference to the accompanying drawings, in which:

DETAILED DESCRIPTION

Figure 2A:
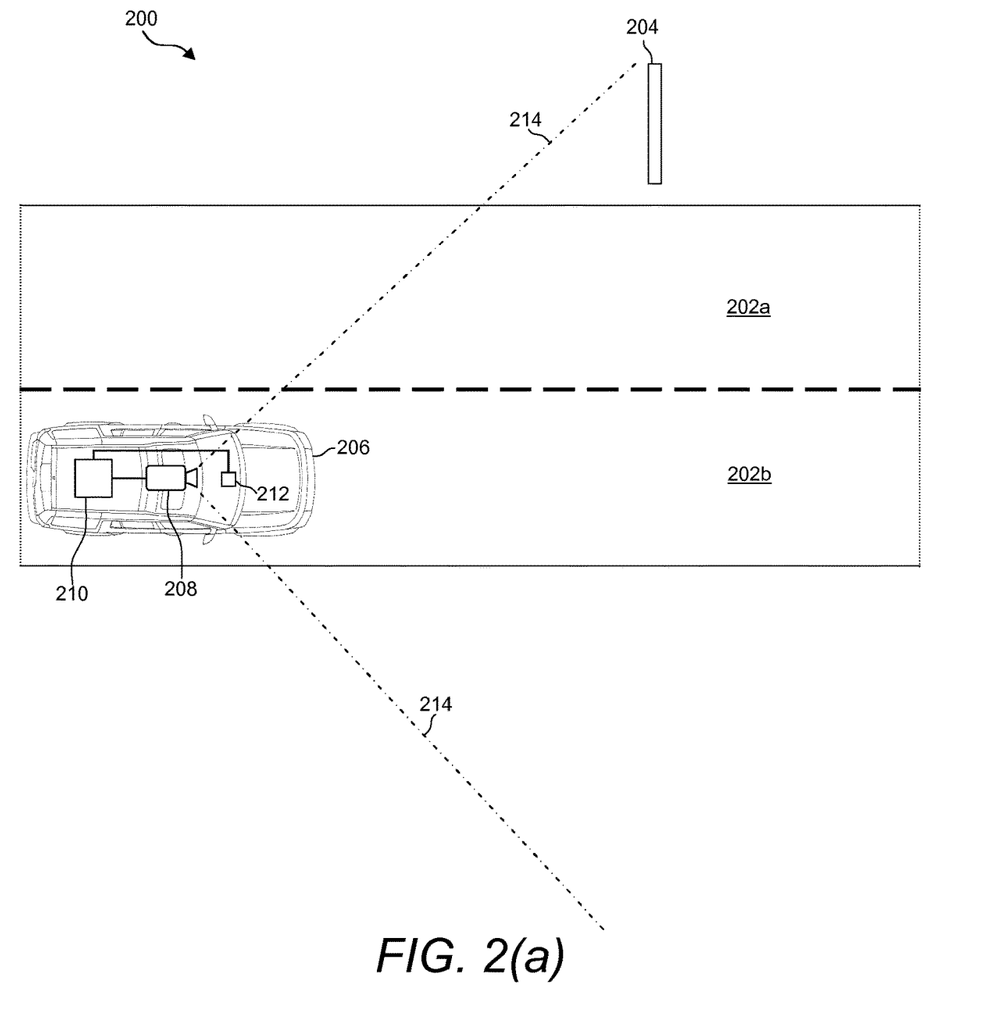
FIG. 2(a) is a schematic top view of a road system with a road sign and a vehicle comprising an overlay system according to an embodiment of the present invention.

FIG. 2(a) shows a road system 200 comprising two parallel traffic lanes (a first lane 202a and a second lane 202b) and a road sign 204. Vehicles in the two traffic lanes travel in the same direction. A vehicle 206 is shown travelling in the road system 200 in the second lane 202b. The vehicle 206 comprises a camera 208, an overlay system 210 and a display 212. In other embodiments the road sign may be located on a gantry over the lanes 202a, 202b.

The camera 208 and the display 212 are each operatively connected to the overlay system 210. The display 212 is a head-up display. In other embodiments, the camera 208 and/or display 212 are wirelessly connected to the overlay system 210.

Figure 2B:
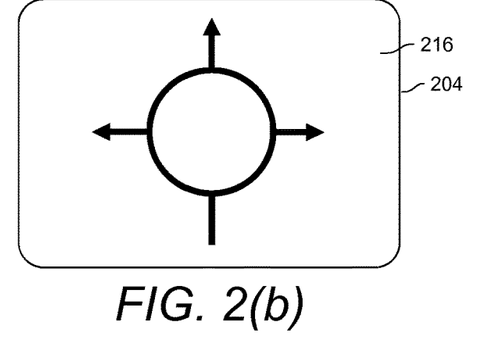
FIG. 2(b) is a schematic front view of the road sign as visible to the overlay system of FIG. 2(a)

The camera 208 has a field of view depicted by the lines 214, which is substantially the same as a field of view as the driver. The road sign 204 is ahead of the vehicle 206 and is in the field of view 214 of the camera 208. FIG. 2(b) shows a front face 216 of the road sign 204 that is visible to the camera 208. The front face 216 provides information regarding an upcoming road layout of the road system 200. The whole of the front face 216 is visible to the camera 208, and hence also to the driver of the vehicle 206.

Figure 5:
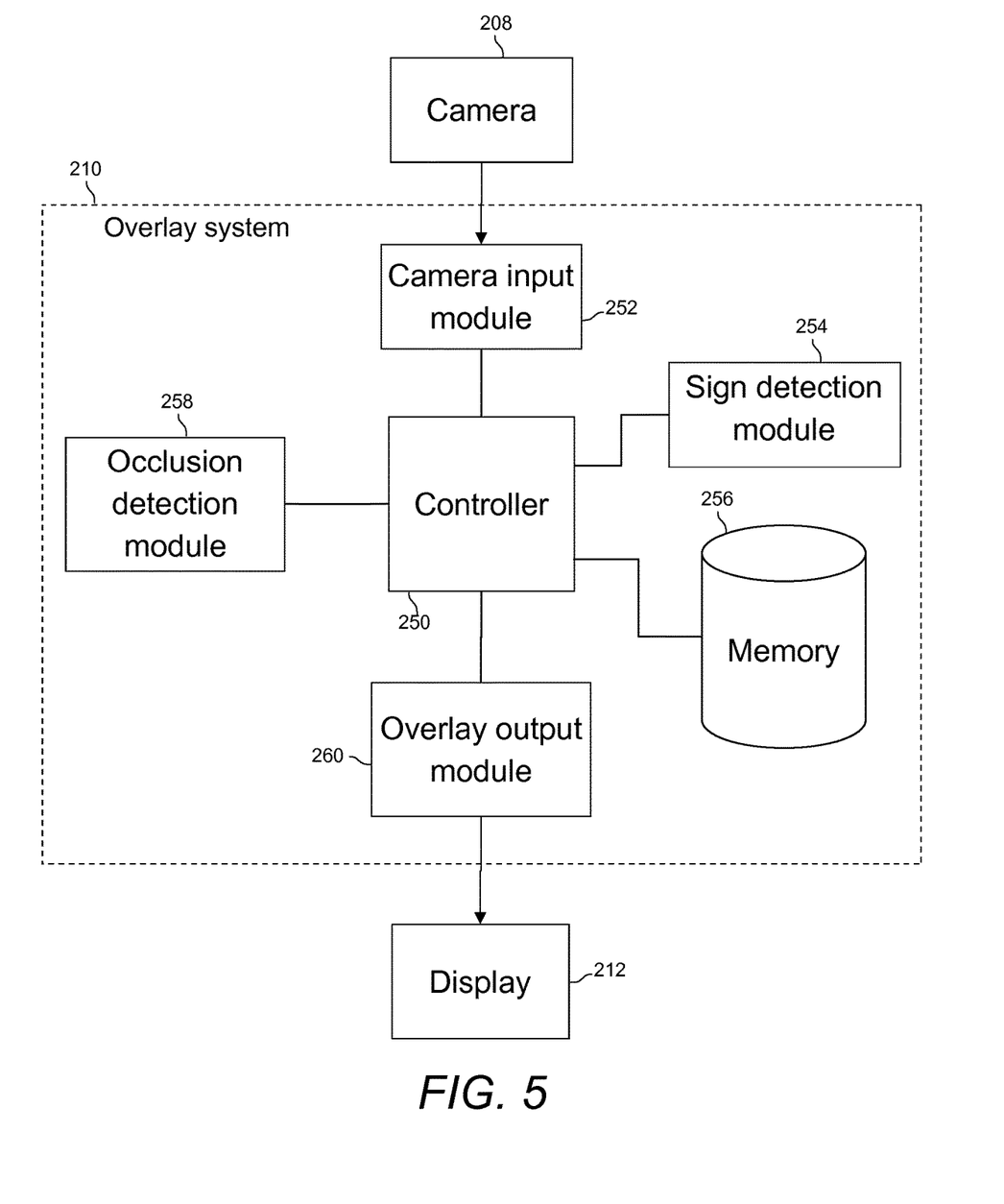
FIG. 5 is a flowchart of a process carried out by the overlay system of FIG. 2.

The overlay system 210 is arranged to continuously monitor the road system 200 using the camera 208 to detect road signs. If any road signs (e.g. road sign 204) are detected, then information associated with the road signs are stored in the sign database 256 (as shown in FIG. 5). The information associated with the road signs includes the front face 216 of the road sign and the location of the road sign in a road system 200. If any of the stored road signs are subsequently blocked from view of the camera, the overlay system 210 is arranged to determine the extent of the blockage (i.e. how much of the road sign is not visible), retrieve the stored road sign, and output the blocked portion to the display 212.

Figure 3A:
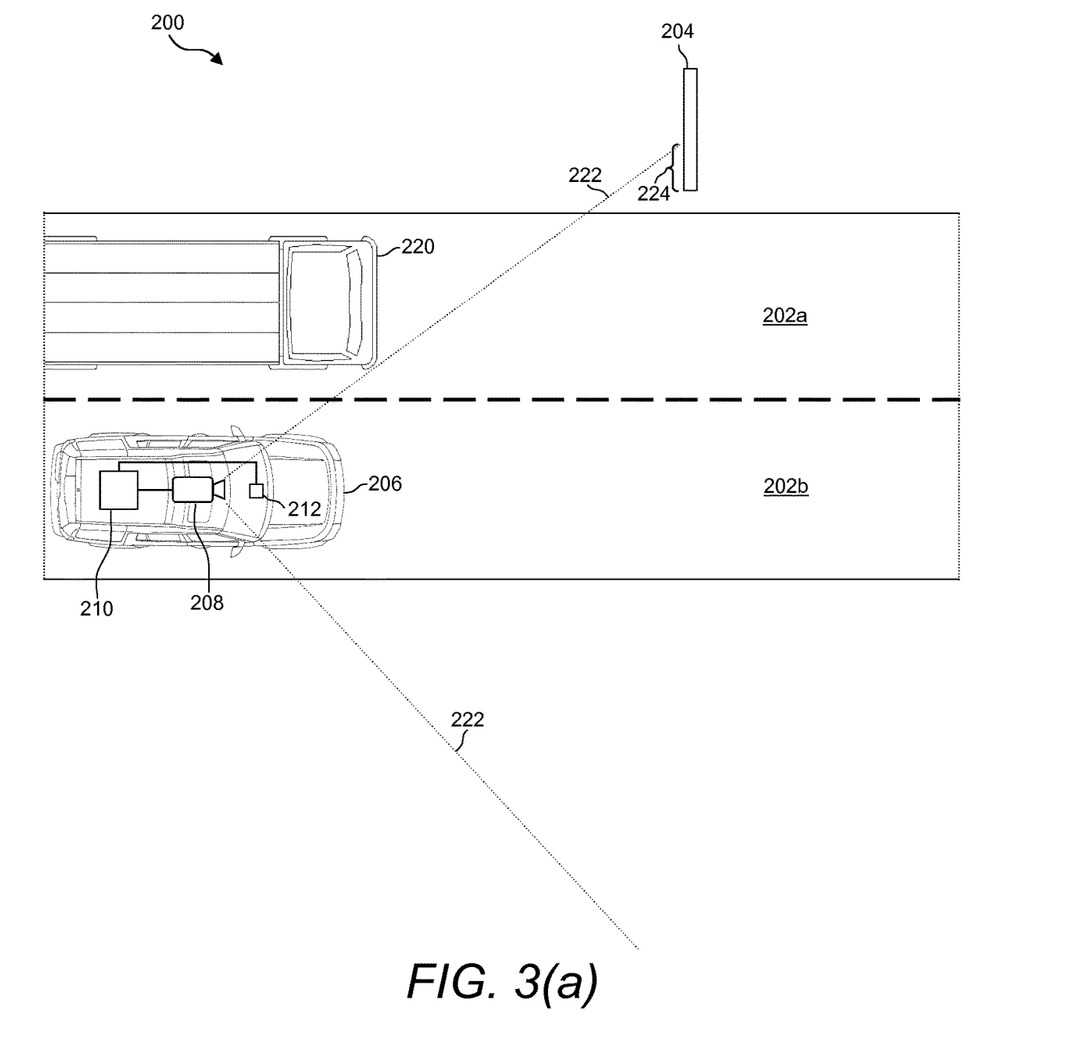
FIG. 3(a) is a schematic top view of the road system of FIG. 2(a) with a goods vehicle travelling parallel to the vehicle.

FIG. 3(a) shows the road system 200 with the vehicle 206 and a goods vehicle 220. The goods vehicle 220 is shown travelling parallel to the vehicle 206 in the first lane 202a. The presence of the goods vehicle 220 affects the field of view of the camera 208, shown as lines 222. In particular, the goods vehicle 220 blocks part of the front face 216 of the road sign 204 such that only a portion 224 of the road sign is visible to the camera 208.

Figure 3B:
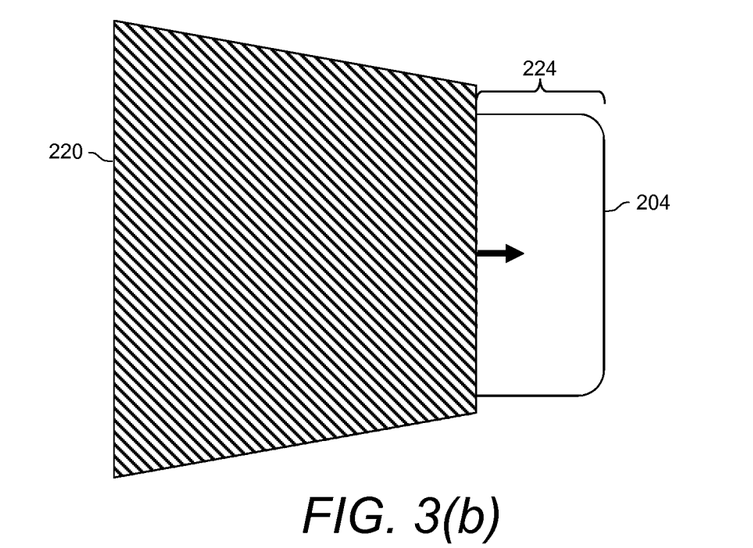
FIG. 3(b) is a schematic front view of the road sign as visible to the overlay system of FIG. 3(a)

FIG. 3(b) shows the portion 224 of the front face 216 of the road sign 204 that would be visible to the vehicle driver due to the obstruction by the side of the goods vehicle 220. As the field of view of the driver is substantially the same at the camera 208, the visible portion 224 is substantially the same. However, in the present embodiment, the overlay system 210 determines that the road sign 204 would be partially obstructed by the good vehicle 220 from the view of the driver, and in response, the overlay system 210 outputs the obstructed portion of the road sign to the display 212.

Figure 3C:
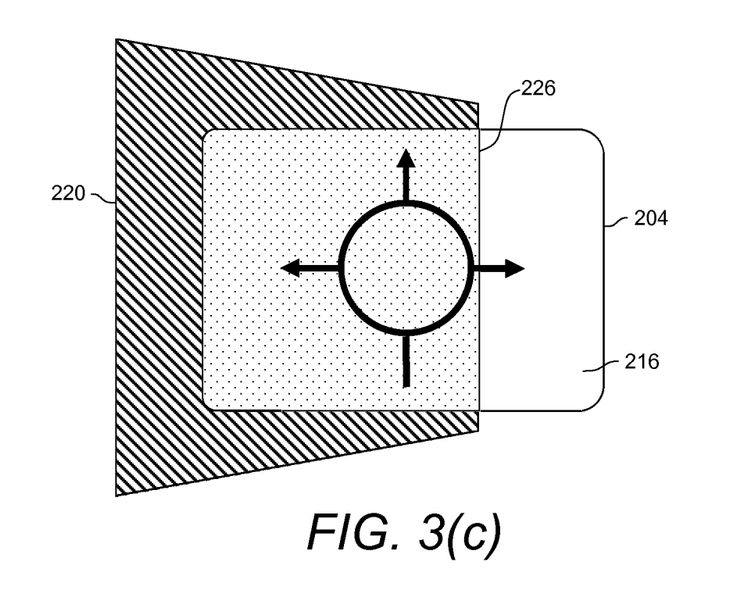
FIG. 3(c) is a schematic front view of the road sign with a partial overlay.

FIG. 3(c) shows a view of the vehicle driver through the heads-up display with the obstructed portion 226 of the road sign being displayed to complete the front face 216 of the road sign 204.

Figure 4A:
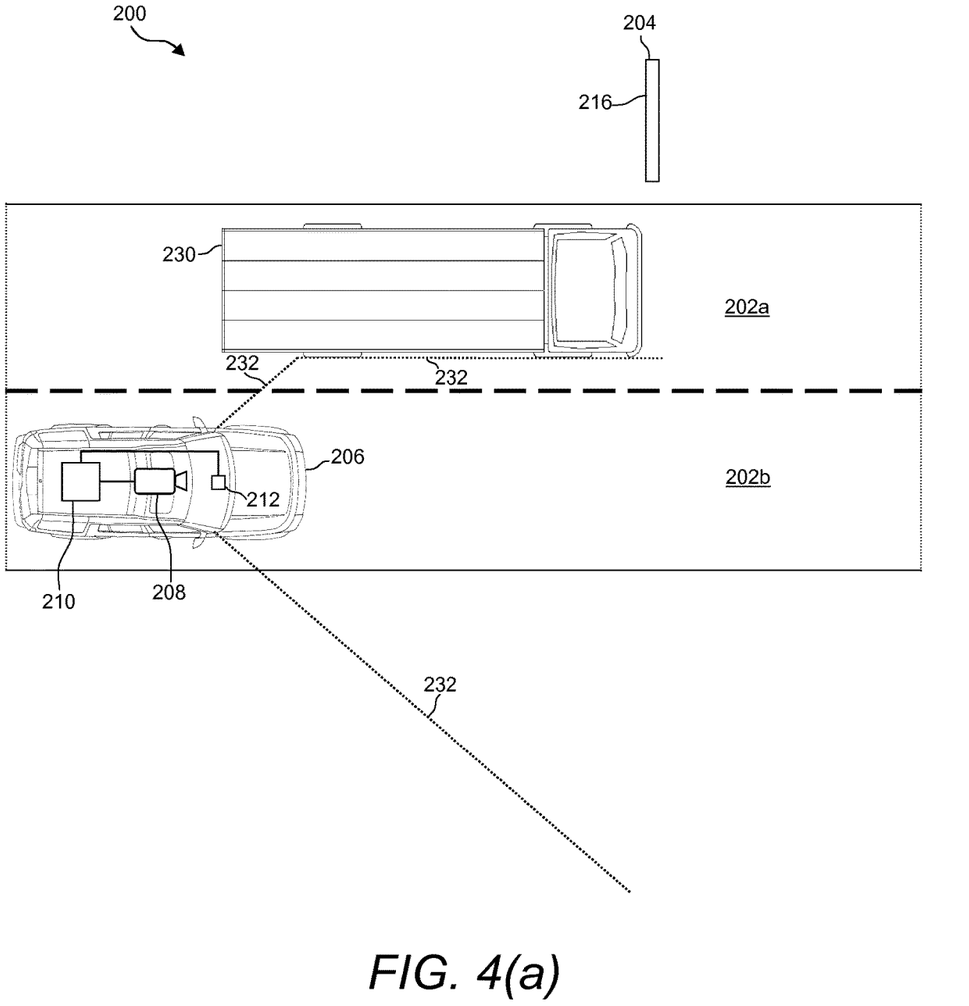
FIG. 4(a) is a schematic top view of the road system of FIG. 2(a) with a goods vehicle travelling parallel to the vehicle.

FIG. 4(a) shows the road system 200 with the vehicle 206 and a goods vehicle 230. The goods vehicle 230 is shown travelling parallel to the vehicle 206 in the first lane 202a. The presence of the goods vehicle 230 affects the field of view of the camera 208, shown as lines 232. In particular, the goods vehicle 230 blocks the whole front face 216 of the road sign 204 such that none of the road sign is visible to the camera 208.

Figure 4B:
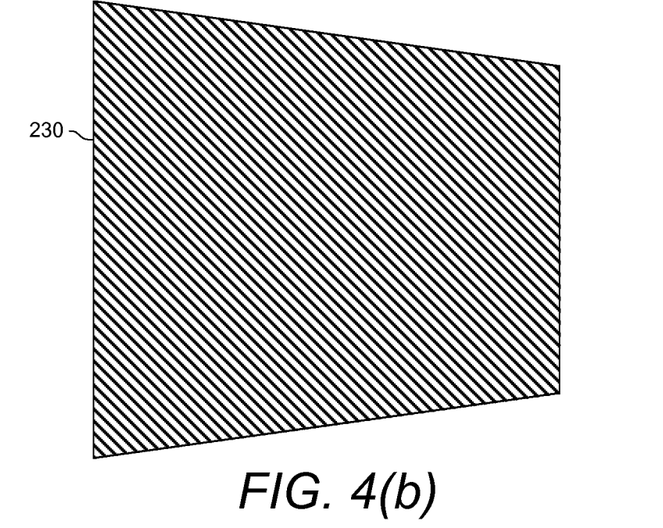
FIG. 4(b) is a schematic front view of the road sign as visible to the overlay system of FIG. 4(a)

FIG. 4(b) shows the view that would be visible to the vehicle driver due to the obstruction by the good vehicle 230. As the field of view of the driver is substantially the same at the camera 208, the road sign is completely obstructed from the view of the driver. However, in the present embodiment, the overlay system 210 determines that the road sign 204 would be completely obstructed by the good vehicle 410 from the view of the driver, and in response, the overlay system 210 outputs the obstructed portion of the road sign to the display 212.

Figure 4C:
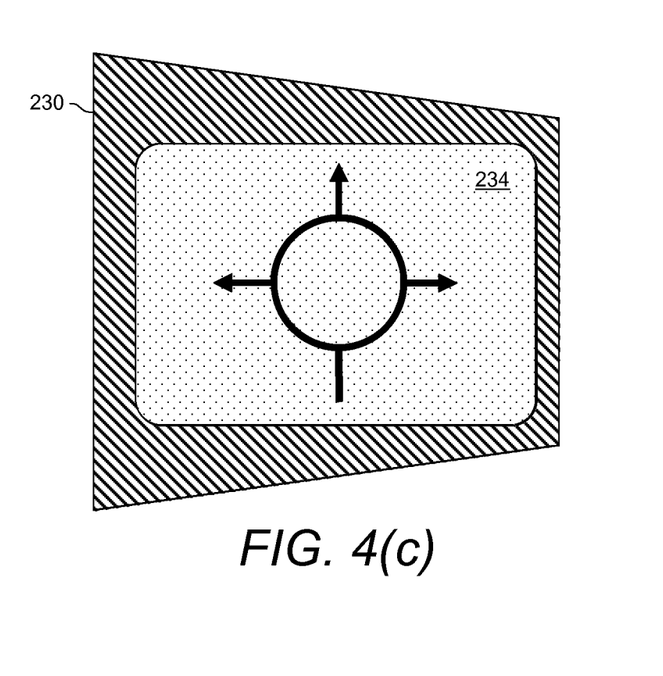
FIG. 4(c) is a schematic front view of the road sign with a full overlay.

FIG. 4(c) shows a view of the vehicle driver through the heads-up display with the obstructed road sign 234 displayed to complete the front face 216 of the road sign 204.

FIG. 5 shows an embodiment of the overlay system 210 in greater detail. The overlay system 210 comprises a controller 250, a camera input module 252, a sign detection module 254, a memory 256, an occlusion detection module 258 and an overlay output module 260. The camera input module 252, the sign detection module 254, the memory 256, the occlusion detection module 258 and the overlay output module 260 are each operatively connected to the controller 250.

The camera input module 252 is arranged to receive input from the camera 208. The camera 208 is arranged to capture images of the road system 200 at between 24 to 240 frames per second. The camera 208 may be a stereoscopic camera.

The sign detection module 254 is arranged to perform object recognition analysis on the images received by the camera 208 to determine the presence of road signs in the images. For example, the sign detection module 254 may be configured to detect road signs by: shape (e.g. circular, triangular or rectangular); predominant colour (e.g. yellow, green, blue or brown); and/or border colour (e.g. red or white).

The sign detection module 254 is further arranged to determine the location and orientation of any detected road signs relative to the vehicle 206.

In other embodiment the camera 208 is arranged to perform the functionality of the sign detection module 254. In such embodiment, the camera 208 is arranged to perform object recognition analysis on the image captured to determine the presence of road signs in the images. The camera 208 is further arranged to determine the location and/or orientation of any detected road signs relative to the vehicle 206. The camera 208 output comprises one or more of: the image data, the location data and the orientation data.

Any road signs detected in the road system 200, for example road sign 204, are cropped from the camera image and stored in the memory 256. The cropped image comprises the front face of the road sign 204. The road signs are removed from the memory 256 after a predetermined length of time or when the storage space for the memory 256 is full. A representation of the front face of the road sign 204 may be created from the cropped image of the road sign 204. Then the memory may store a representation of the front face of the road sign 204, the location and/or orientation data in association with the road sign 204.

The occlusion detection module 258 is arranged to compare sequential images from the camera 208 which have been identified as comprising a road sign in order to detect whether less of the road sign is visible in subsequent images.

The overlay output module 260 is arranged to determine and output representations of signs stored in the memory 256 to the display 212. The overlay output module 260 may be arranged to output the representation based on the determined location and orientation of the road sign being displayed.

Figure 6:
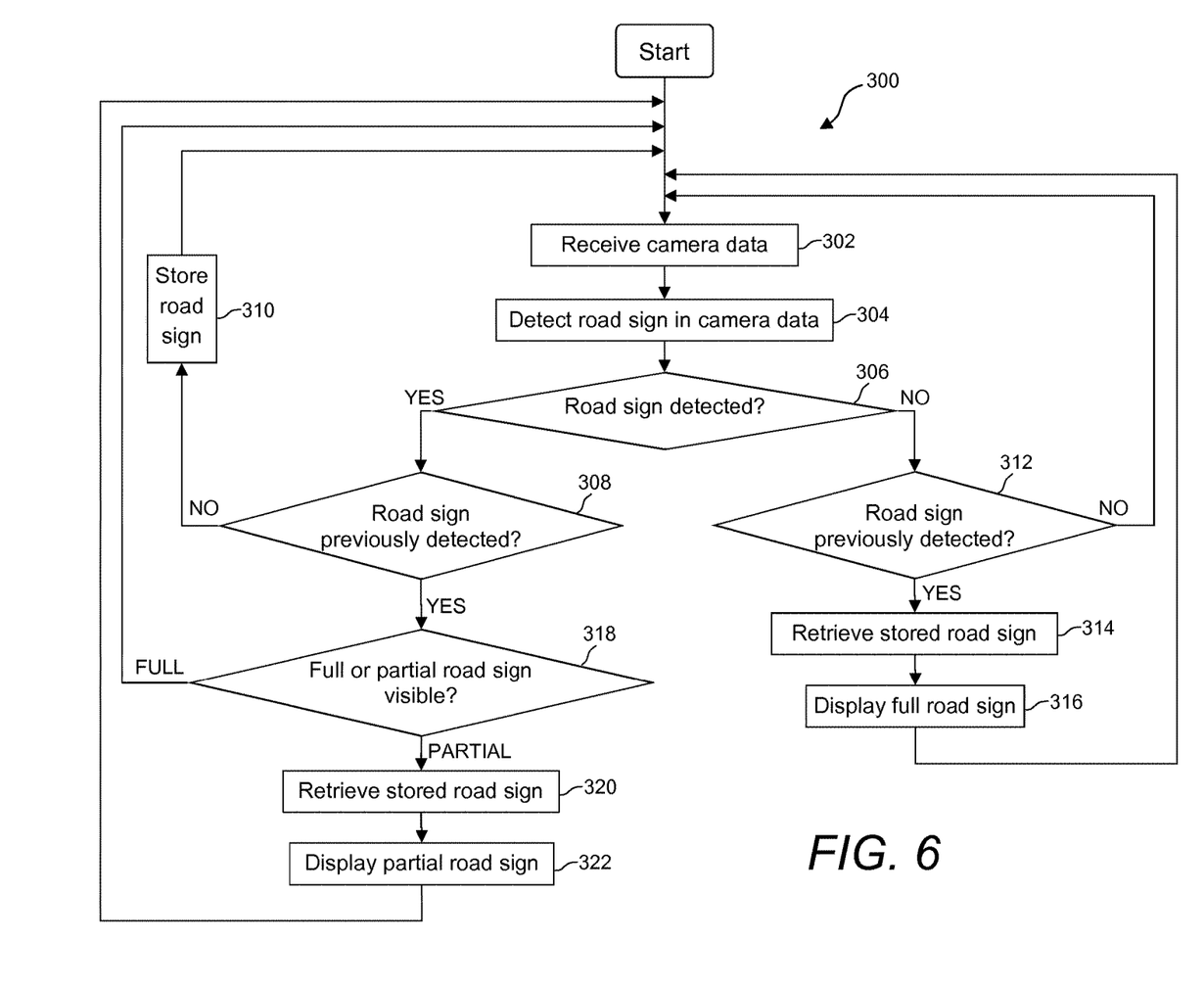
FIG. 6 is a schematic block diagram of the overlay system of FIG. 2.

FIG. 6 shows a process 300 carried out by an embodiment of the overlay system 210. The process 300 begins with the camera input module 252 receiving at Step 302 an image (i.e. a video frame) from the camera 208. Then the sign detection module 254 detects at Step 304 any road signs present in the camera image, as well as the locations of any road signs relative to the vehicle 206.

The sign detection module 254 checks at Step 306 whether any road signs were detected in the image. If one or more road signs are detected, the occlusion detection module 258 checks at Step 308 whether road signs were detected in the previous image received from the camera 208. If no road signs were previously detected, then the sign detection module 254 extracts (i.e. crops) any road signs from the current image and stores at Step 310 any extracted road signs in the memory 256. Following this, the process 300 returns to Step 302.

If following the check at Step 306 whether any road signs were detected in the image, no road signs are detected, then the occlusion detection module 258 checks at Step 312 whether road signs were detected in the previous image received from the camera 208. The occlusion detection module 258 takes into account the movement of the vehicle 206 (forwards and lateral) and the locations of any road signs relative to the vehicle 206 determined at Step 304, in order to determine whether the vehicle 206 has moved past the location of the sign. In other words, the occlusion detection module 258 checks whether the road sign is no longer expected to be in view of the camera 208.

If following the check at Step 312, no road signs were previously detected, the process 300 returns to Step 302. However, if following the check at Step 312 road signs were previously detected and the vehicle 206 has not travelled past the road sign, this means that the road sign has now been obstructed from view of the camera 208. Accordingly, the overlay output module 260 retrieves at Step 314 the previously detected road sign from the memory 256. Then the overlay output module 260 determines the size, orientation and location of where the sign is expected to be. The overlay output module 260 also determines a representation of the road sign corresponding to the expected size, orientation and location of the road sign, and outputs at Step 316 the representation of the road sign for display on the display 212. Following this, the process 300 returns to Step 302. The effect of this is that, as the vehicle 206 approaches the location of the road sign 204, the representation of the road sign increases in size.

Returning to the check at Step 308, if the outcome of the check is that one or more road signs were detected in the previous image received from the camera 208, then the occlusion detection module 258 determines at Step 318 whether the full front face of the road sign is visible, or if only part of the road sign is visible. The occlusion detection module 258 takes into account the movement of the vehicle 206 (forwards and lateral) and the locations of any road signs relative to the vehicle 206 determined at Step 304, in order to determine whether the vehicle 206 has begun to move past the location of the sign. In other words, the occlusion detection module 258 checks whether the full front face of the road sign is no longer expected to be in view of the camera 208.

If following the check of Step 318, the full front face of the road sign is visible, then there is no occlusion or obstruction, and the process 300 returns to Step 302.

However, if following the check of Step 318 only a part of the road sign is visible, this is indicative that the road sign is being partially blocked from the field of view of the camera 208. Accordingly, the overlay output module 260 retrieves at Step 320 the previously detected road sign from the memory 256. Then the overlay output module 260 determines the size, portion, orientation and location of where the sign is expected to be. The overlay output module 260 also determines a representation of the road sign corresponding to the expected size, portion, orientation and location of the road sign, and outputs at Step 322 the representation of the road sign for display on the display 212. Following this, the process 300 returns to Step 302.

In an alternative embodiment, an overlay system comprises location determining means (e.g. a GPS receiver) and a database storing information associated with a set of road signs (the information associated with the road signs includes the front face 216 of the road sign and the location of the road sign in a road system 200). The overlay system is arranged to determine the location of the vehicle using the location determining means and, accordingly, the road signs that should be in the field of view of the camera 208. The overlay system is arranged to determine if the road signs that should be in the field of view of the camera 208 are blocked, and outputs a representation of the road sign in response.

Figure 7:
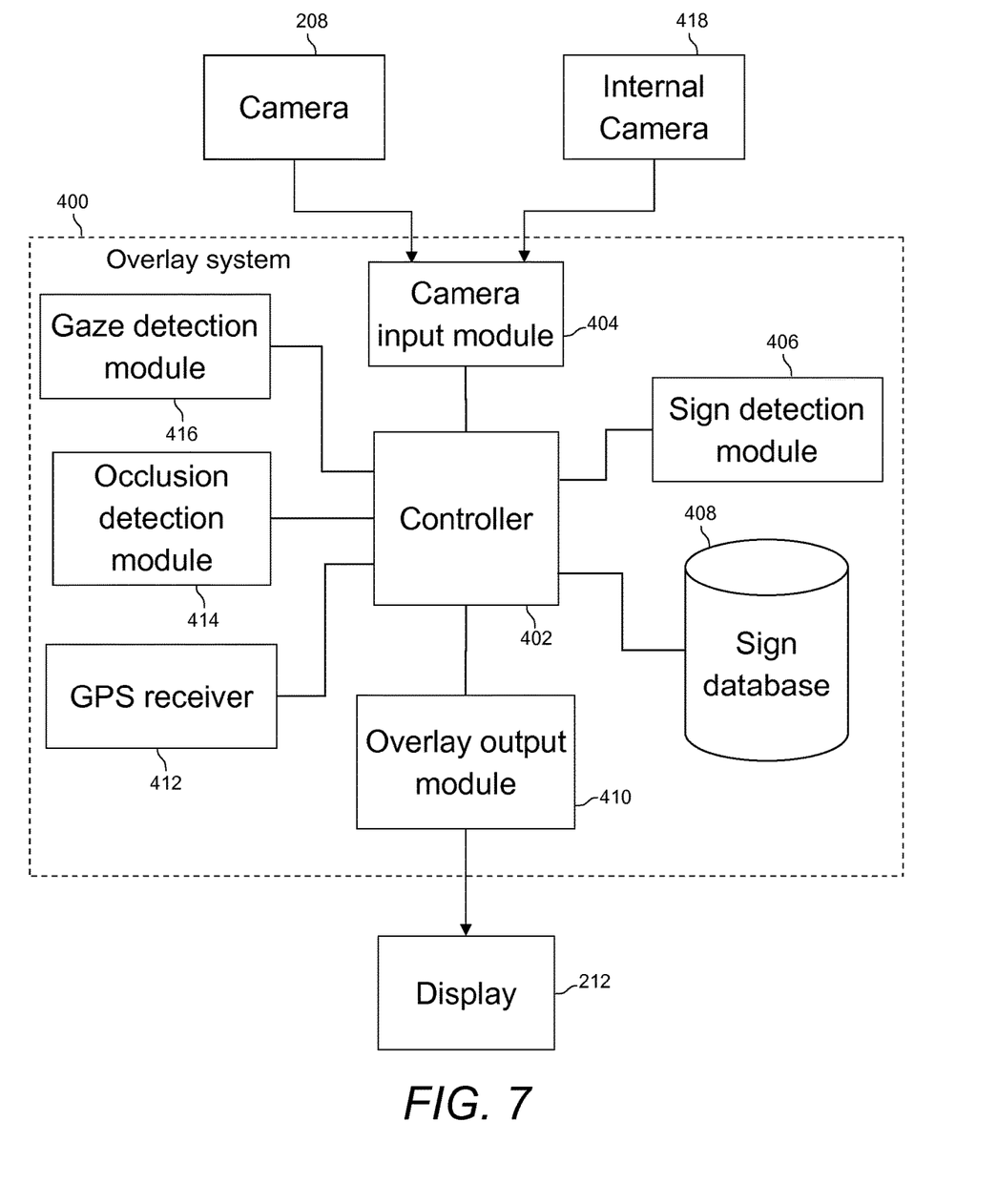
FIG. 7 is a schematic block diagram of an overlay system according to an embodiment of the present invention.

FIG. 7 shows the alternative embodiment of the overlay system 400. The overlay system 400 comprises a controller 402, a camera input module 404, a sign detection module 406, a sign database 408, an overlay output module 410, a GPS receiver 412, an occlusion detection module 414, and a gaze detection module 416. The camera input module 404, the sign detection module 406, the sign database 408, the overlay output module 410, the GPS receiver 412, the occlusion detection module 414, and the gaze detection module 416 are each operatively connected to the controller 402.

The camera input module 404 is arranged to receive input from the camera 208. The vehicle 206 further comprises an internal camera 418 connected to the camera input module 404. The internal camera 418 is directed at the driver of the vehicle, and may be focussed on the driver's face.

The sign database 408 comprises information associated with a set of road signs (the information associated with the road signs includes the front face 216 of the road sign and the location of the road sign in a road system 200). The set of road signs may be all the road signs in a geographic area, or the road signs along a route along which the vehicle is travelling. As shown in FIG. 7 the sign database 408 is located locally on the vehicle 206. The sign database may receive information associated with road signs from a remote server. In an alternative arrangement the overlay system 400 may be in communication with a remote database 408. For example, the remote database 408 may be located in another vehicle or cloud or any structure/building near the road. If the vehicle is on a guided route then the information associated with a set of road signs in relation to the guided route take priority in the communication with a remote database 408.

The GPS receiver 412 is arranged to determine the location of the vehicle 206 by receiving timing information from GPS satellites as is known in the art. In other embodiments, the location of the vehicle may be determined by other means such as cellular network multilateration as is known in the art.

The sign detection module 406 is substantially the same as the sign detection module 254 and is arranged to perform object recognition analysis on the images received by the camera 208 to determine the presence of road signs in the images. The sign detection module 406 is further arranged to determine the location of any detected road signs relative to the vehicle 206 using information from the GPS receiver 412 to determine road signs that are expected to be in the field of view of the camera 208.

The occlusion detection module 414 is substantially the same as the occlusion detection module 258 and is arranged to compare sequential images from the camera 208 which have been identified as comprising a road sign in order to detect whether less of the road sign is visible in subsequent images.

The overlay output module 410 is substantially the same as the overlay output module 260 and is arranged to determine and output representations of signs stored in the sign database 408 to the display 212.

The gaze detection module 416 is arranged to determine where the driver is looking, and what the driver is looking at. For example, taking the following 3D coordinates:

Object Viewed by Driver (e.g. a road sign): $O=[x_O, y_O, z_O]$
Driver's Head: $D=[x_D, y_D, z_D]$
Forward Facing Camera: $C=[x_C, y_C, z_C]$
And the following vectors:
$DO \rightarrow = [O-D]$
Determine eye gaze vector for the driver via the internal camera 418 based on eye gaze direction and head position.
$DC \rightarrow = [D-C]$
Both the Driver's Head and the camera 208 are in the same coordinate system.
$CO \rightarrow = [O-C]$ This vector shows the path between the camera 208 and the object viewed by the Driver. $DO \rightarrow$ is outputted by the internal camera 418 and the camera 208 is able to position this in its 3D model.

To determine the distance to the object, the internal camera 418 uses eye vergence to provide an estimate of distance. The camera 208 is stereoscopic to estimate target distance and is used for closest match to eye vergence. The object detected by the camera 208 that is intercepted or nearest to the gaze vector is considered the object of visual interest.

If there is a head movement of the driver, then the internal camera 418 recalculates the new co-ordinates of the eye position (since the camera 208 and the internal camera 418 are of fixed positions). As the vehicle moves, the relative position of the object also changes. The gaze detection module 416 tracks the new coordinates as the vehicle moves. The gaze detection module 416 can calculate the spatial co-ordinates of the object (e.g. road sign), which is intercepted by the gaze vector.

Figure 8:
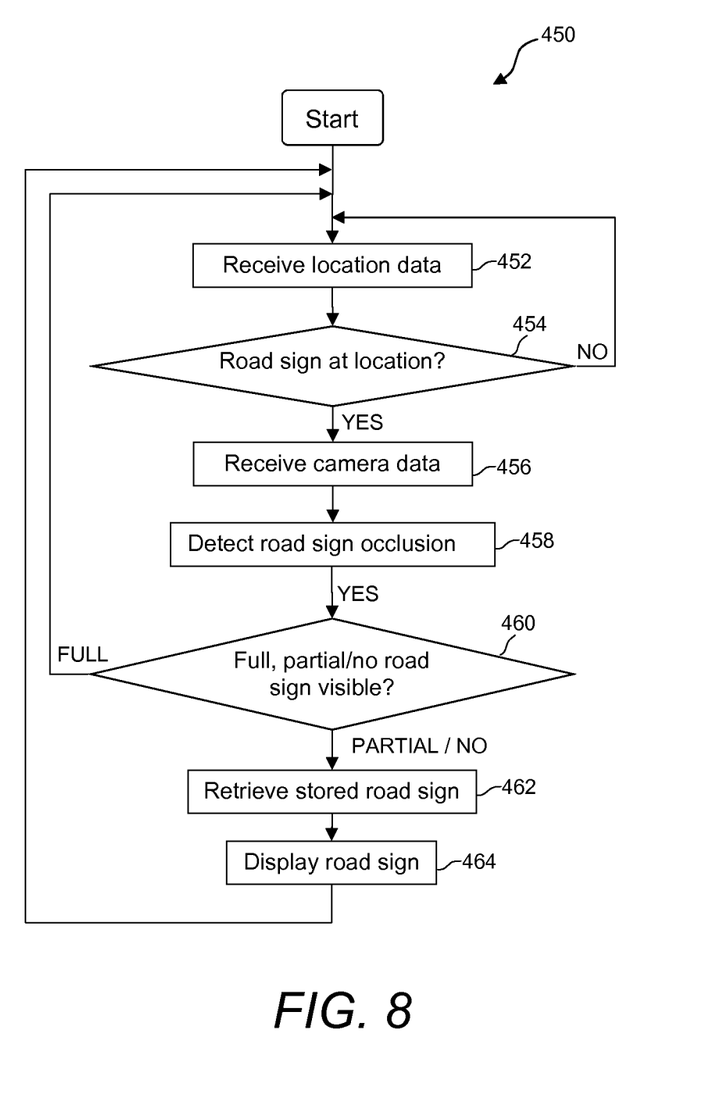
FIG. 8 is a flowchart of a process carried out by the overlay system of FIG. 7.

FIG. 8 shows a process 450 carried out by the overlay system 400. The process 450 begins with the GPS receiver 412 receiving at Step 452 the location of the vehicle 206. Based on the received location, the sign detection module 406 determines at Step 454, using information from the sign database 408, whether there are any signs that are expected to be in the field of view of the camera 208. If not, the process 450 returns to Step 452.

If following the check of Step 454, there are expected to be road signs in the field of view of the camera 208, then the camera input module 404 receives at Step 456 an image (i.e. a video frame) from the camera 208. The occlusion detection module 414 determines at Step 458 whether the road signs that are expected to be in the field of view of the camera 208 are visible. The occlusion detection module 414 checks at Step 460 whether the full front face of the road sign is visible, or if none or only part of the road sign is visible. If the full front face of the road sign is visible, then the process 450 returns to Step 452.

However, if following the check of Step 460, none or only part of the road sign is visible to the camera 208, then the overlay output module 410 retrieves at Step 462 the road sign from the sign database 408. Then the overlay output module 410 determines the size, portion, orientation and location of where the sign is expected to be. The overlay output module 410 also determines a representation of the road sign corresponding to the expected size, portion, orientation and location of the road sign, and outputs at Step 464 the representation of the road sign for display on the display 212. Following this, the process 450 returns to Step 452.

It will be appreciated that the functionality of camera input module 252; 404, the sign detection module 254; 406, the overlay output module 260; 410, the occlusion detection module 258; 414 and the gaze detection module 416 may be performed by one or more processors. When performed by multiple processors the processors may be located independently from each other.

It will be appreciated that road sign comprises static signs and active signs having changeable content where the content may be changed over time. Active signs may be car parking information, road work and traffic information signs.

Many modifications may be made to the above examples without departing from the scope of the present invention as defined in the accompanying claims.

For example, if a road sign is fully obscured, then the representation of the road sign on the display 212 may be at any orientation and location, and not necessarily match the actual orientation and location of the road sign.

In other embodiments, the display 212 may be a display in a centre console of the vehicle or a display in the dashboard of the vehicle.

Optical character recognition may be used to detect words and place names from the signs.

The invention claimed is:

1. A computer-implemented method of displaying a representation of a road sign, the method comprising:
   receiving information associated with the road sign, the information associated with the road sign comprising a front face of the road sign and a location of the road sign in a road system;
   receiving an image from a camera of a vehicle, the road sign being within the field of view of the camera and the image being one of a sequence of images from the camera;
   determining, using the image, an amount of the road sign that is obstructed comparing sequential images from the camera;
   generating, based on the amount of the road sign that is obstructed, the representation of the road sign using the information associated with the road sign; and
   outputting the representation of the road sign for display on a display of the vehicle.

2. The computer-implemented method of claim 1, wherein the information associated with the road sign is received from the camera and the representation is generated based on the image and the location from the camera.

3. The computer-implemented method of claim 1, wherein the information associated with the road sign is received from a remote server and stored in a database, and the representation is generated based on the information in the database.

4. The computer-implemented method of claim 1, wherein the display is a head-up display.

5. The computer-implemented method of claim 4, comprising outputting the representation of the road sign on the head-up-display to be overlaid over the position of the road sign when viewed by a user.

6. The computer-implemented method of claim 1, wherein the camera comprises a wide angle lens.

7. The computer-implemented method of claim 1, wherein the information associated with the road sign is determined by the sign detection module and the representation is generated based on the determined information, the sign detection module is further arranged to determine the location and orientation of any detected road signs relative to the vehicle.

8. A non-transitory computer-readable storage medium comprising computer-readable instructions for a computer processor to carry out the computer-implemented method of claim 1.

9. A virtual overlay system for displaying a representation of a road sign, within a vehicle, the system comprising:
   an input arranged to receive:
      information associated with the road sign, the information associated with the road sign comprising a front face of the road sign and a location of the road sign in a road system; and
      an image from a camera of the vehicle, the road sign being within the field of view of the camera and the image being one of a sequence of images from the camera;
   a processor arranged to:
      determine, using the image, an amount of the road sign that is obstructed 11y comparing sequential images from the camera; and
      generate, based on the amount of the road sign that is obstructed, the representation of the road sign using the information associated with the road sign; and
   an output arranged to output the representation of the road sign for display on a display of the vehicle.

10. The system of claim 9, wherein the information associated with the road sign is received from the camera, and the representation is generated based on the image and the location from the camera.

11. The system of claim 9, wherein the information associated with the road sign is received from a remote server and stored in a database, and the representation is arranged to be generated based on the information in the database.

12. The system of claim 9, wherein the display is a head-up-display.

13. The system of claim 12, wherein the representation of the road sign is arranged to be output to the head-up-display to be overlaid over the position of the road sign when viewed by a user of the system.

14. The system of claim 9, wherein the camera comprises a wide angle lens.

15. The system of claim 9, wherein the information associated with the road sign is determined by the sign detection module and the representation is generated based on the determined information, the sign detection module is further arranged to determine the location and orientation of any detected road signs relative to the vehicle.

16. A vehicle comprising the system of claim 9.

17. An electronic processor comprising:
   an electrical input for receiving signals comprising:
      information associated with the road sign, the information associated with the road sign comprising a front face of the road sign and a location of the road sign in a road system; and
      image information from a camera of a vehicle, the road sign being within the field of view of the camera and the image information being one of a sequence of images from the camera; and
   an electronic memory device electrically coupled to the electronic processor and having instructions stored therein;
   wherein the processor is configured to:
      access the memory device and execute instructions stored therein such that it is operable to determine, using the image information, an amount of the road sign that is obstructed by comparing sequential images from the camera;
      generate, based on the amount obstructed, the representation of the road sign using the information associated with the road sign; and
      output the representation of the road sign for display on a display of the vehicle.

18. A vehicle comprising the electronic processor of claim 17.

* * * * *